W. B. MITCHELL.

HARROW DRAG.

APPLICATION FILED SEPT. 18, 1911.

Reissued Dec. 19, 1911. 13,340.

WITNESSES:
R. G. Lockwood
J. H. Swan.

INVENTOR.
Wickliff B. Mitchell
BY
V. H. Lockwood
ATTORNEY.

COLUMBIA PLANOGRAPH CO., WASHINGTON, D. C.

UNITED STATES PATENT OFFICE.

WICKLIFF B. MITCHELL, OF BEDFORD, INDIANA, ASSIGNOR, BY MESNE ASSIGNMENTS, TO BEDFORD HARROW-DRAG COMPANY, A CORPORATION.

HARROW-DRAG.

13,340. Specification of Reissued Letters Patent. Reissued Dec. 19, 1911.

Original No. 981,455, dated January 10, 1911, Serial No. 576,814. Application for reissue filed September 18, 1911. Serial No. 650,010.

*To all whom it may concern:*

Be it known that I, WICKLIFF B. MITCHELL, a citizen of the United States, residing at Bedford, in the county of Lawrence and State of Indiana, have invented a new and useful Harrow-Drag, of which the following is a specification.

This invention has relation to a combined harrow and drag structure and consists in the novel construction and arrangement of its parts as hereinafter shown and described.

The object of the invention is to provide a simple combined harrow and drag structure comprising a series of spaced drag beams held in fixed relation to each other and provided with reversible harrow blades which are held in vertical parallel planes by removable securing devices, preferably one securing device securing an entire transverse row or series of harrow blades and preferably located at the forward edge of a beam. The said securing devices are so mounted and constructed that they may be readily withdrawn so that the blades may be easily and quickly reversed in their positions upon the beams and thus as the blades wear at their forward ends they may be turned so that their rear unworn ends may be forwardly disposed or vice versa, or replaced.

Figure 1:
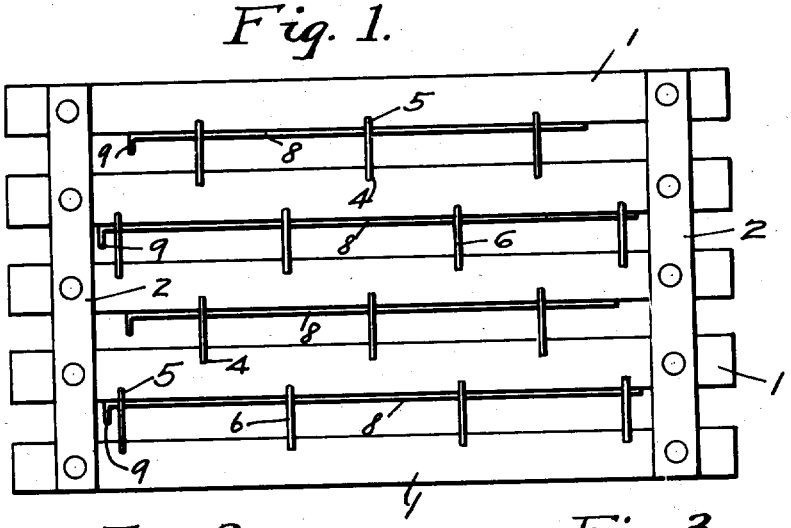
Figure 2:
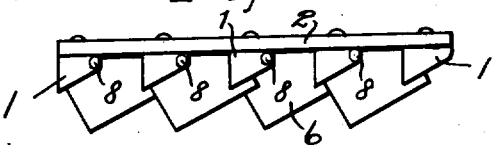
Figure 3:
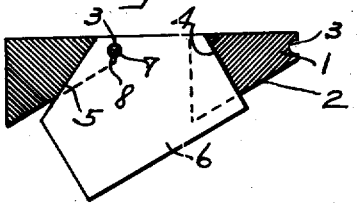
Figure 4:
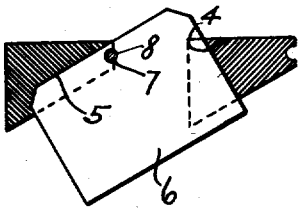
Figure 5:
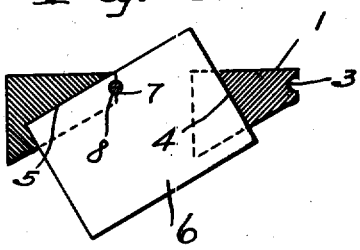

In the accompanying drawings:—Figure 1 is a top plan view of the harrow drag. Fig. 2 is a side elevation of the same. Fig. 3 is a detail sectional view of portions of the harrow drag showing one form of blade attached thereto. Fig. 4 is a detail sectional view of portions of the harrow showing another form of blade attached thereto. Fig. 5 is a detail sectional view of portions of the harrow showing still another form of blade attached thereto.

The harrow drag consists of drag beams 1 which are secured together by bars 2 and which are held by the said bars in spaced relation as indicated in Figs. 1 and 2 of the drawings. The beams 1 are of greater vertical thickness at their rear portions than at their forward portions and the said beams are provided at their forward edges with longitudinally disposed grooves 3. The beams 1 are provided at their rear edges with kerfs or incisions 4 and at their forward edge portions with kerfs or incisions 5. The kerfs or incisions 4 at the rear edges of the forward beam are in the same vertical plane as the kerfs or incisions 5 of the next adjacent beam 1 to the rear. The kerfs and incisions 4 and 5 of the adjacent beams 1 are adapted to receive the forward and rear end portions, respectively, of blades 6. The blades 6 are provided in their upper portions with perforations 7 and rods 8 pass through the perforations 7 of all the blades 6 between two adjacent beams 1 and the said rods 8 lie in the grooves 3 provided at the forward edges of the said beams 1. The said rods 8 may be held against longitudinal movement by frictional contact with the said grooves 3 or other means may be provided for preventing the said rods from moving after they have been positioned in the said grooves and passed through the perforations 7 in the blades 6. Each rod 8 is provided at one end with an angularly disposed portion 9, whereby the said rod may be readily withdrawn in a direction longitudinal or lengthwise when it is desired to remove the blades 6 from the kerfs for the purpose of reversing the same in the manner above indicated.

It will be seen from Figs. 3, 4 and 5 of the drawings that the blades 6 may be of any desired configuration and the blade 6 as illustrated in Fig. 3 is provided with a pointed upper edge portion, while the blade as shown in Fig. 4 is cut away at its upper corner. The blade as shown in Fig. 5 is in the form of an oblong and the kerfs or incisions 4 and 5 in the rear and forward edges of the beams 1 are correspondingly formed to receive the blades of the various configurations. The forward and rear halves are similarly shaped so they may be reversed, if desired. When one or more blades in a harrow structure has become worn at its forward or rear portion to such an extent as to become unserviceable, the rod 8 holding the said blade or blades may be withdrawn from the recess or recesses 3, and the said blade or blades may be reversed from their positions between the adjacent beams 1, thus some one portion of the blade will be exposed or subjected to the work, while those portions of the blade which have become worn will be so positioned as to escape the soil as the implement is drawn over the surface of the same.

I claim as my invention:

1. A harrow drag including a frame having transverse drag beams spaced apart and provided with vertically disposed incisions in the opposing surfaces and with inclined forward surfaces to drag on the ground, vertical harrow plates between said drag beams and projecting into said incisions, and removable means mounted in connection with said drag beams for holding said plates in position.

2. A harrow drag including a frame having transverse drag beams spaced apart and provided with vertically disposed incisions in their opposing surfaces, vertical harrow plates between said drag beams and projecting into said incisions, and a single means removably mounted in connection with one of said drag beams for holding in position the harrow blades which are in a row transversely of the device.

3. A harrow drag including a frame having transverse drag beams spaced apart and provided with vertically disposed incisions in their opposing surfaces, vertical harrow plates between said drag beams and projecting into said incisions, a rod extending through the harrow plates which are located in a transverse row, and means for holding the rod in connection with a drag beam so that the rod can be withdrawn from said drag beam and plates.

4. A harrow drag including a frame having transverse drag beams spaced apart and provided with vertically disposed incisions in their opposing surfaces, vertical harrow plates between said drag beams and with the front and rear halves similarly shaped and projecting into said incisions, and removable means mounted in connection with said drag beams which is inserted through said plates midway between the forward and rear ends thereof for holding the same in position and permitting them to be reversed.

5. A harrow drag including a frame having transverse beams spaced apart and with an inclined upward and forward bevel on the under side thereof and provided with vertically disposed incisions in their rear surfaces and also in the inclined beveled surfaces, vertically disposed plates fitting in each pair of incisions in said beams, and removable means connecting the upper middle portion of each plate with the forward edge of the rear beam with which each plate is associated, whereby the plates will be held up in the inclined slot and be secured in place.

6. A harrow drag comprising spaced beams, said beams having at their rear edges incisions and at their forward edges incisions, the incisions at the rear edges of the forward beams being in the same vertical plane as the incisions at the forward edges of the next beam to the rear and so on throughout the series of beams, said beams having at their forward edges longitudinally disposed grooves, blades inserted at their forward and rear end portions in the incisions at the rear and forward edges of adjacent beams, and rods passing transversely through the blades located between the same beams and lying at their intermediate portions in the grooves at the forward edges of the said beams.

In testimony that I claim the foregoing as my own, I have hereto affixed my signature in the presence of two witnesses.

WICKLIFF B. MITCHELL.

Witnesses:

THOS. C. UNDERWOOD,
LOGAN R. BROWNING.

Copies of this patent may be obtained for five cents each, by addressing the "Commissioner of Patents. Washington, D. C."